United States Patent
Peng (10) Patent No.: US 9,438,544 B2
(45) Date of Patent: Sep. 6, 2016

(54) PROCESSING METHOD FOR MOBILE DEVICE TO DISPLAY EMAIL, SERVER, AND MOBILE DEVICE

(71) Applicant: Huawei Device Co., Ltd., Shenzhen, Guangdong (CN)

(72) Inventor: Jun Peng, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 724 days.

(21) Appl. No.: 13/731,479

(22) Filed: Dec. 31, 2012

(65) Prior Publication Data

US 2013/0124656 A1 May 16, 2013

Related U.S. Application Data (63) Continuation of application No. PCT/CN2012/070452, filed on Jan. 17, 2012.

(30) Foreign Application Priority Data

Jan. 25, 2011 (CN) .......................... 2011 1 0026946

(51) Int. Cl.
*G06F 15/16* (2006.01)
*G06F 15/173* (2006.01)
(Continued)

(52) U.S. Cl.
CPC .............. *H04L 51/066* (2013.01); *H04L 51/38* (2013.01)

(58) Field of Classification Search
CPC . H04L 12/58; H04L 12/581; H04L 12/5835; H04L 12/5895; H04L 51/066; H04L 51/14; H04L 51/28; H04L 51/38; H04L 51/063; H04L 29/06; H04L 29/066; H04L 67/04; H04L 67/303; H04L 67/2823

USPC ....... 709/206–207, 217, 219, 226, 232, 246, 709/248; 455/412.1, 414.1, 414.2, 435.1, 455/456.6, 466
See application file for complete search history.

(56) References Cited

U.S. PATENT DOCUMENTS 6,223,213 B1 * 4/2001 Cleron ................. G06Q 10/107
709/206
7,197,705 B1 3/2007 Nagae
(Continued)

FOREIGN PATENT DOCUMENTS

CN 1286445 A 3/2001
CN 101146059 A 3/2008
(Continued)

OTHER PUBLICATIONS

Communication from a foreign counterpart application, International Application No. PCT/CN2012/070452, International Search Report dated Apr. 19, 2012, 4 pages.
(Continued)

*Primary Examiner* — Farzana Huq
(74) *Attorney, Agent, or Firm* — Conley Rose, P.C.; Grant Rodolph; Nicholas K. Beaulieu (57) ABSTRACT

The present invention relates to a processing method for a mobile device to display an email, a server, and a mobile device. The method for processing an email includes: after receiving an email downloading request from a client, checking, by a server, a processing capability of the client, where the processing capability is reported to the server by the client when the client is connected to the server, and where the processing capability includes a supported coding/decoding manner and character set; in the case that the client does not have a capability for processing an email that is requested to be downloaded, converting, by the server and according to the processing capability of the client, a body of the email into a format that is processable for the client; and sending, by the server, a converted email to the client, so that the client displays an attachment.

18 Claims, 3 Drawing Sheets

(51) Int. Cl.
*H04L 12/58* (2006.01)
*H04M 1/725* (2006.01)
*H04M 3/42* (2006.01)
*H04W 4/00* (2009.01)
*H04W 24/00* (2009.01)

(56) References Cited

U.S. PATENT DOCUMENTS

| | | | |
|---|---|---|---|
| 2003/0078982 A1 | 4/2003 | Ogawa | |
| 2003/0093565 A1* | 5/2003 | Berger | H04L 12/5835 709/246 |
| 2003/0163819 A1* | 8/2003 | Lee | H04L 12/5835 725/61 |
| 2003/0212542 A1* | 11/2003 | Lee | G06F 17/289 704/7 |
| 2005/0033814 A1* | 2/2005 | Ota | H04L 12/5825 709/206 |
| 2005/0257142 A1* | 11/2005 | Lai | G06F 17/2247 715/239 |
| 2006/0218234 A1* | 9/2006 | Deng | H04L 51/066 709/206 |
| 2007/0255792 A1* | 11/2007 | Gronberg | 709/206 |
| 2008/0037582 A1* | 2/2008 | Wang | 370/466 |
| 2008/0172470 A1* | 7/2008 | Horn | 709/206 |
| 2010/0115038 A1 | 5/2010 | McEachern et al. | |
| 2010/0313255 A1* | 12/2010 | Khuda | G06F 9/4448 726/7 |
| 2012/0165048 A1* | 6/2012 | Zhu | G06F 17/289 455/466 |

FOREIGN PATENT DOCUMENTS

| | | |
|---|---|---|
| CN | 101616370 A | 12/2009 |
| CN | 102158819 A | 8/2011 |
| EP | 1081619 A2 | 3/2001 |

OTHER PUBLICATIONS

Communication from a foreign counterpart application, International Application No. PCT/CN2012/070452, Partial English Translation, International Search Report dated Apr. 19, 2012, 3 pages.
Foreign Communication From a Counterpart Application, Chinese Application 201110026946.1, Chinese Office Action dated Mar. 5, 2013, 28 pages.
Foreign Communication From a Counterpart Application, Chinese Application 201110026946.1, Partial English Translation of Chinese Office Action dated Mar. 5, 2013, 9 pages.
Foreign Communication From a Counterpart Application, European Application No. 12738986.4, Extended European Search Report dated Nov. 6, 2013, 7 pages.

* cited by examiner

PROCESSING METHOD FOR MOBILE DEVICE TO DISPLAY EMAIL, SERVER, AND MOBILE DEVICE

CROSS-REFERENCE TO RELATED APPLICATION

This application is a continuation of International Application No. PCT/CN2012/070452, filed on Jan. 17, 2012, which claims priority to Chinese Patent Application No. 201110026946.1, filed on Jan. 25, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a processing method for a mobile device to display an electronic mail (email), a server, and a mobile device.

BACKGROUND

Emails, as a common way of communication between enterprise users currently, have been used by more and more people. Therefore, people of different languages need to use different character sets when using emails.

In the prior art, for emails by means of a personal computer (PC), an email client is usually installed in the PC, the client downloads an email, performs coding/decoding at the client, and then displays the email to a user. Because a PC system supports a strong character set and coding/decoding manner, the PC system may use many resources to support numerous coding/decoding manners and character sets. When parsing email information or performing coding/decoding on an email, the client may choose, according to a requirement, a corresponding coding/decoding manner and character set to perform coding/decoding on the email, and display codes and character sets in multiple languages, so as to satisfy requirements of people of different languages.

For a mobile device such as a mobile phone, due to the restriction of a system resource such as storage space, power consumption, and a device cost, the mobile device cannot support all coding/decoding manners and character sets. For a specific market group, it is only possible to embed a relevant character set in the mobile device and to support several coding/decoding manners. As a result, for an email with an incompatible coding/decoding manner or character set, the mobile device cannot display a body of the email.

SUMMARY

Embodiments of the present invention provide a processing method for a mobile device to display an email, a server, and a mobile device, so as to solve a problem in the prior art that a mobile device cannot display a body of an email because of an incompatible coding/decoding manner or character set.

An embodiment of the present invention provides a processing method for a mobile device to display an email, where the method includes: after receiving an email downloading request from a client, checking, by a server, a processing capability of the client, where the processing capability is reported to the server by the client when the client is connected to the server, and where the processing capability includes a supported coding/decoding manner and character set; in the case that the client does not have a capability for processing an email that is requested to be downloaded, converting, by the server according to the processing capability of the client, a body of the email into a format that is processable for the client; and sending, by the server, a converted email to the client.

An embodiment of the present invention further provides a processing method for a mobile device to display an email, where the method includes: sending, by a client, a connection request to a server, where the connection request includes information of a processing capability of the client or a path of a location where the information of the processing capability is located, and where the processing capability includes a supported coding/decoding manner and character set; sending, by the client, an email downloading request to the server; and receiving, by the client, a converted email sent by the server, where the converted email is obtained after the server converts, according to the processing capability of the client, in the case that the client does not have a capability for processing an email that is requested to be downloaded, a body of the email into a format that is processable for the client.

An embodiment of the present invention further provides a server, including: a capability checking unit configured to, after a server receives an email downloading request from a client, check a processing capability of the client, where the processing capability is reported to the server by the client when the client is connected to the server, and the processing capability includes a supported coding/decoding manner and character set; an email converting unit configured to, in the case that the client does not have a capability for processing an email that is requested to be downloaded, covert, according to the processing capability of the client, a body of the email into a format that is processable for the client; and a sending unit configured to send an email to the client, where the email is obtained through conversion of the email converting unit.

An embodiment of the present invention further provides a mobile device, which is installed with a client, where the client includes: a first sending unit configured to send a connection request to a server, where the connection request includes information of a processing capability of the client or a path of a location where the information of the processing capability is located, and where the processing capability includes a supported coding/decoding manner and character set; a second sending unit configured to send an email downloading request to the server; and an email receiving unit configured to receive a converted email sent by the server, where the converted email is obtained after the server converts, according to the processing capability of the client, in the case that the mobile device does not have a capability for processing an email that is requested to be downloaded, a body of the email into a format that is processable for the client.

With the processing method for a mobile device to display an email, the server, and the mobile device that are provided in the embodiments of the present invention, a server processes an email that cannot be displayed by a client and performs format conversion, according to a processing capability of the client, on a format that cannot be displayed in the mobile client, so that a problem in the prior art that a mobile device cannot display an email because of an incompatible coding/decoding manner or character set is solved, and it is ensured that the client of the mobile device can display all emails, thereby improving compatibility and usability of an email.

BRIEF DESCRIPTION OF THE DRAWINGS

To illustrate the technical solutions in the embodiments of the present invention more clearly, the accompanying drawings required for describing the embodiments are introduced briefly in the following. Apparently, the accompanying drawings in the following description merely show some embodiments of the present invention, and persons of ordinary skill in the art may also derive other drawings from these accompanying drawings without creative efforts.

DETAILED DESCRIPTION

The technical solutions in the embodiments of the present invention are described clearly and completely in the following with reference to the accompanying drawings in the embodiments of the present invention. Apparently, the embodiments to be described are merely a part rather than all of the embodiments of the present invention. Based on the embodiments of the present invention, all other embodiments obtained by persons of ordinary skill in the art without creative efforts shall fall within the protection scope of the present invention.

Figure 1:
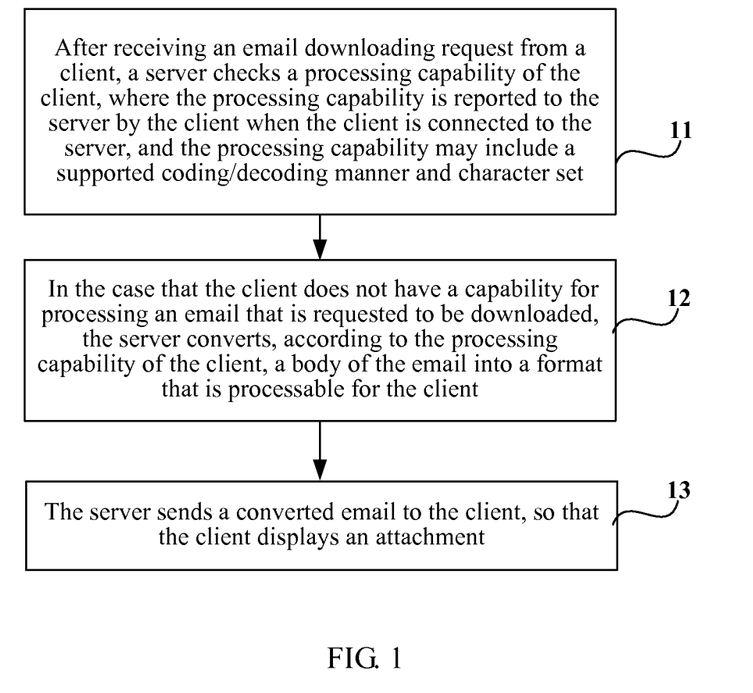
FIG. 1 is a flow chart of a processing method for a mobile device to display an email according to an embodiment of the present invention.

FIG. 1 is a flow chart of a processing method for a mobile device to display an email according to an embodiment of the present invention. As shown in FIG. 1, the method includes:

Step 11: After receiving an email downloading request from a client, a server checks a processing capability of the client, where the processing capability is reported to the server by the client when the client is connected to the server, and the processing capability may include a supported coding/decoding manner and character set, which is detailed in the following description.

Step 12: In the case that the client does not have a capability for processing an email that is requested to be downloaded, the server converts, according to the processing capability of the client, a body of the email into a format that is processable for the client.

Step 13: The server sends a converted email to the client, so that the client displays an attachment.

The server may send the converted email to the client in the form of the email before the conversion, that is, directly send an email to the client after replacing a body of an original email with a text that can be displayed by the client, or in other words, send the email to the client after replacing the body of the original email with a text that can be displayed by the client. The email before the conversion is the original email.

The server may also send the converted email as an attachment of the original email to the client, where the body of the original email may be replaced with a prompt text that can be displayed by the client, and the prompt text is used to prompt a user that the original email cannot be displayed, for example, "The content of the email cannot be displayed. Please view the attachment xxx.png." At this time, the attachment can be downloaded together with the body. In an Internet Message Access Protocol (IMAP), downloading of an attachment separately is also supported. Alternatively, a key word for prompting that the converted email has been used as an attachment, for example, an email header X-Content-Change-Att<content123@test.com>; X-Content-Change-DisplayName:"content", may also be added in the body of the original email, which indicates that the server has converted the content of the email and has made one attachment, where this attachment may be the email before the conversion.

In step 11 to step 13, the server may be an email server or an email proxy server. If the email server does not support the foregoing operation steps, similar processing may be performed through the email proxy server. Before the server receives the email downloading request made by the client, the method may further include:

Receive a connection request from the client, where the connection request includes information of the processing capability of the client or a path of a location where the information of the processing capability is located, so that the server obtains the processing capability of the client, which may specifically include:

The client sends a request for connecting to an email server or an email proxy server (collectively referred to as a server).

When the client is connected to the server, the client may inform the server of the processing capability of the client in the following three manners.

Manner 1: When the client indicates an identity to the server by using an ehco command or a helo command, the identity represents the processing capability of the client. Moreover, a capability corresponding to each identity is obtained by the server in a certain way. For example, a user registers with the server, or an operator provides a uniform path for query of the server. For example:

helo mobile1
helo mobile2
helo http://xxxxx/..x/x.html
helo mobile1: http://xxxxx/..x/x.html If information following helo is a website address, the server may obtain device capability information through the address. If the information following helo indicates information such as a mobile phone type, the server automatically stores device capability information after obtaining the device capability information.

Manner 2: The client indicates an identity by using an extended field and sends a user-agent information field or a user-profile information field of the client to the server. When obtaining the information field through parsing, the server can obtain device information by visiting this webpage. For example:

X-Client-user_profile:http://xxx.xxx
Or
X-Client-user_agent:BASE64.

The server may store related information in combination with an ehco command or a helo command, and may use the stored information to obtain the processing capability of the client next time.

Manner 3: The client directly describes the processing capability of the device by using one or more instructions. For example:

X-Client-Ability:BASE64 Gb2312 PNG AVI or

X-Client-Ability-Charset: Gb2312

X-Client-Ability-Encode: BASE64

After the server completes information exchange with the client, the client may apply to the server for downloading an email, for example, perform step 11.

With the technical solution provided in this embodiment, a server processes an email that cannot be displayed by a client, and performs format conversion, according to a processing capability of a client in a mobile device, on a format that cannot be displayed in the mobile client, so that it is ensured that the client of the mobile device can display all emails, thereby improving compatibility and usability of an email.

Figure 2:
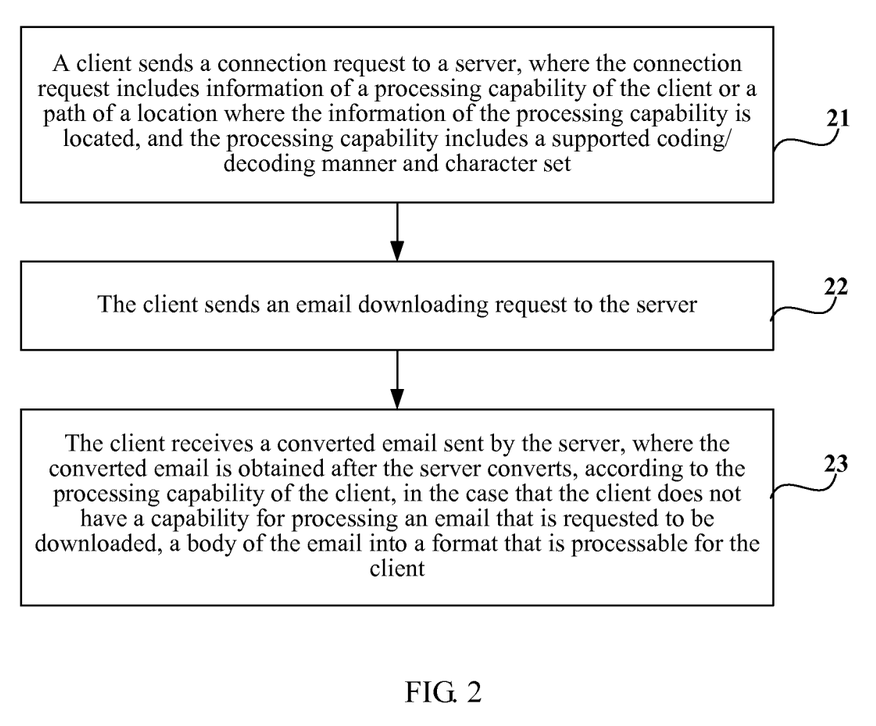
FIG. 2 is a flow chart of another processing method for a mobile device to display an email according to an embodiment of the present invention.

Corresponding to the foregoing embodiment, FIG. 2 is a flow chart of another processing method for a mobile device to display an email according to an embodiment of the present invention. In this embodiment, the client is an email client of a mobile device such as a mobile phone. As shown in FIG. 2, the method includes:

Step 21: A client sends a connection request to a server, where the connection request includes information of a processing capability of the client or a path of a location where the information of the processing capability is located, and the processing capability includes a supported coding/decoding manner and character set, and for details, reference is made to the description of the foregoing method embodiment.

Step 22: The client sends an email downloading request to the server, and for details, reference is made to the description of the foregoing method embodiment.

Step 23: The client receives a converted email sent by the server, where the converted email is obtained after the server converts, according to the processing capability of the client, in the case that the client does not have a capability for processing an email that is requested to be downloaded, a body of the email into a format that is processable for the client.

When the server sends an original email and an attachment together to the client, after receiving the email, the client may process the email as a normal email without special processing or may prompt the user to view the attachment. By viewing the attachment, the user can obtain information of the email. For example, the client may prompt "The content of the email cannot be displayed. Please view the attachment xxx.png."

When the server converts the converted email into an attachment of an original email and sends the attachment to the client, and a body of the original email is replaced with a prompt text that can be displayed by the client, or a key word for prompting that the converted email has been used as an attachment is added in the original email, after the client receives the converted email sent by the server, the method may further include: displaying the prompt text. For details of the prompt text and the key word for prompting that the converted email has been used as an attachment, reference is made to the description of step 12.

Alternatively, before the client receives the converted email sent by the server, the method may further include:

receiving, by the client, an original email in which a mail header whose content is an identifier (ID) of a new email is added and which is sent by the server. For details of the mail header whose content is the ID of the new email, reference is made to the description of step 13.

In the case that a user views an attachment list, the client downloads the attachment from the server.

Specifically, the client may automatically download this attachment and may also prompt the user whether to obtain a displayable downloaded attachment when opening the email, for example, prompting "The content of the email cannot be displayed. Download a new attachment to view the content of the email?" when opening the email, and the client downloads this attachment only when the user chooses to download the attachment; alternatively, the client may also not prompt the user to download the attachment when opening the email, and the client downloads the attachment first when the user views the attachment in the attachment list.

When the server generates a new email based on the converted email, adds an email header whose content is an ID of the new email in an original email, and sends to the client the original email in which the email header is added, before the client receives the converted email sent by the server, the method may further include: receiving, by the client, the original email in which the email header is added and which is sent by the server, and prompting, by the client, the user whether to download the new email generated by the server.

In the case that the user chooses to download the new email, the client downloads the new email from the server.

Specifically, when opening the email, the client prompts the user and inquires of the user whether to download the new email provided by the server, and if the user chooses to download the new email, the new email is downloaded according to X-Content-Change-NewMsgID: <content123@test.com>. After downloading the new email, the client may process, in its own way, an existence relationship between the original email and the new email, for example, directly delete the original email and display only the new email. The new email may include all information of the original email, for example, a sender, a replier, and so on.

Before the client sends a request for applying for downloading an email to the server, the method may further include:

The client sends a connection request to the server, where the connection request includes information of the processing capability of the client or a path of a location where the information of the processing capability is located. For details, reference is made to the description of the embodiment shown in FIG. 1.

In this embodiment, by receiving a converted email returned by a server, an email client of a mobile device can receive a body of a converted email that is displayable for the client in the case that the email cannot be displayed by the client, so that a problem in the prior art that a mobile device cannot display an email due to a limited system resource is effectively solved, thereby improving character set processing compatibility of an email and improving usability of the email.

In the foregoing method embodiment, a method for prompting that an original email cannot be displayed and that a user should please view an attachment is not limited to extending an email header, and may also use another equivalent identifiable key field for operation. In addition, the conversion of a body is not limited to a conversion operation on the body, for example, on an attachment. It should be noted that, if an attachment carried in an original email needs to be converted, the server needs to obtain a capability of a receiving terminal for processing an attachment; and for example, if the receiving terminal can process a word document, but cannot process a document in a Portable Document Format (PDF), when a format of an attachment carried in the original email is a PDF, the server needs to convert the attachment in the PDF into a document in a WORD form.

Persons of ordinary skill in the art may understand that all or part of the steps of the method embodiments may be implemented by a program instructing relevant hardware. The program may be stored in a computer readable storage medium. When the program runs, the steps of the method embodiments are performed. The storage medium may be any medium capable of storing program codes, such as a read-only memory (ROM), a random-access memory (RAM), a magnetic disk, or an optical disk.

Figure 3:
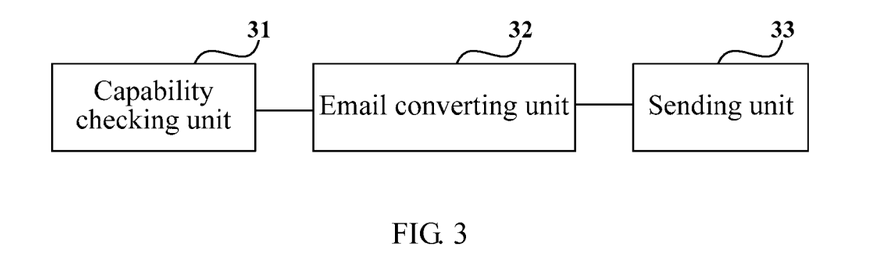
FIG. 3 is a schematic structural diagram of a server for implementing the processing method for a mobile device to display an email according to an embodiment of the present invention.

FIG. 3 is a schematic structural diagram of a server for implementing the processing method for a mobile device to display an email according to an embodiment of the present invention. As shown in FIG. 3, the server includes: a capability checking unit 31, an email converting unit 32, and a sending unit 33.

The capability checking unit 31 is configured to, after a server receives an email downloading request from a client, check a processing capability of the client, where the processing capability is reported to the server by the client when the client is connected to the server, and the processing capability includes a supported coding/decoding manner and character set.

The email converting unit 32 is configured to covert, in the case that the client does not have a capability for processing an email that is requested to be downloaded, according to the processing capability of the client, a body of the email into a format that is processable for the client.

The sending unit 33 is configured to send an email to the client, where the email is obtained through conversion of the email converting unit, so that the client displays an attachment.

The sending unit 33 may include: a first sending subunit configured to send the email to the client directly, where the email is obtained through conversion of the email converting unit; and an email processing subunit configured to generate an attachment based on the email that is obtained through conversion of the email converting unit, and add in a body of an original email a key word for prompting that the original email has been used as an attachment.

Alternatively, the sending unit 33 may include: a second sending subunit configured to generate an attachment based on the converted email and send the attachment to the client.

The server provided in this embodiment of the present invention may further include: a connection request receiving unit configured to, before receiving the email downloading request from the client, receive a connection request from the client, where the connection request includes information of the processing capability of the client or a path of a location where the information of the processing capability is located.

By using the capability checking unit, the email converting unit, and the sending unit, the server provided in the foregoing embodiment processes an email that cannot be displayed by a client, performs format conversion, according to a processing capability of the client, on a format that cannot be displayed in the mobile client, and sends the email to the client of the mobile device, so that it is ensured that the client of the mobile device can display all emails, thereby improving compatibility and usability of an email.

Figure 4:
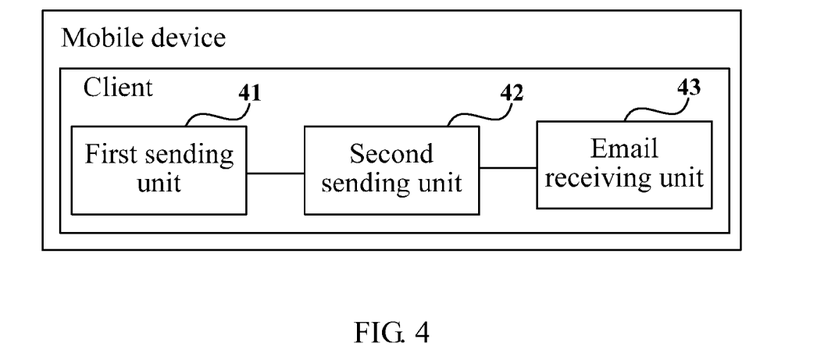
FIG. 4 is a schematic structural diagram of a mobile device for implementing the processing method for a mobile device to display an email according to an embodiment of the present invention.

Accordingly, FIG. 4 is a schematic structural diagram of a mobile device for implementing the processing method for a mobile device to display an email according to an embodiment of the present invention. As shown in FIG. 4, the mobile device is installed with a client, and the client includes: a first sending unit 41, a second sending unit 42, and an email receiving unit 43.

The first sending unit 41 is configured to send a connection request to a server, where the connection request includes information of a processing capability of the client or a path of a location where the information of the processing capability is located, and the processing capability includes a supported coding/decoding manner and character set.

The second sending unit 42 is configured to send an email downloading request to the server.

The email receiving unit 43 is configured to receive a converted email sent by the server, where the converted email is obtained after the server converts, according to the processing capability of the client, in the case that the mobile device does not have a capability for processing an email that is requested to be downloaded, a body of the email into a format that is processable for the client.

By using the first sending unit, the second sending unit, and the email receiving unit, the mobile device provided in the foregoing embodiment applies to a server and receives an email that cannot be displayed by a client and is processed by the server according to a processing capability of the client in the mobile device, so that it is ensured that the client of the mobile device can display all emails, thereby improving compatibility and usability of an email.

Finally, it should be noted that the foregoing embodiments are only used for describing the technical solutions of the present invention, but are not intended to limit the present invention. Although the present invention is described in detail with reference to the foregoing embodiments, persons of ordinary skill in the art should understand that they can still make modifications to the technical solutions described in the foregoing embodiments, or make equivalent substitutions to some technical features of the technical solutions, as long as these modifications and substitutions do not cause the corresponding technical solutions to depart from the spirit and scope of the technical solutions in the embodiments of the present invention.

What is claimed is:

1. A processing method for a mobile device to display an email comprising:
    receiving, by a computer processor of a server, a connection request from a client, wherein the connection request from the client comprises a processing capability of the client, wherein the processing capability of the client comprises an indication of a language character set supported by the client;
    receiving, by the computer processor of the server, an email downloading request from the client;
    sending, by the computer processor of the server, prompt text to the client, wherein the prompt text notifies the client that content of the email cannot be displayed and inquires whether the client wants to display the content;
    converting, by the computer processor of the server according to the processing capability of the client, a body of the email into a format that is processable for the client when the client does not have a capability for processing the email requested to be downloaded; and sending, by the computer processor of the server, a converted email to the client, wherein sending, by the computer processor of the server, the converted email to the client comprises generating, by the computer processor of the server, and attachment based on the converted email and sending the attachment to the client.

2. The processing method according to claim 1, wherein sending, by the computer processor of the server, the converted email to the client comprises sending, by the computer processor of the server, the converted email to the client directly.

3. A processing method for a mobile device to display an email comprising:
sending, by a computer processor of a client, a connection request to a server, wherein the connection request from the client comprises a processing capability of the client, wherein the processing capability of the client comprises an indication of a language character set supported by the client;
sending, by the computer processor of the client, an email downloading request to the server;
receiving, by the computer processor of the client, prompt text from the server, wherein the prompt text notifies the client that content of the email cannot be displayed and inquires whether the client wants to display the content; and
receiving, by the computer processor of the client, a converted email sent by the server, wherein the converted email is obtained after the server converts, according to the processing capability of the client, a body of the email into a format that is processable for the client when the client does not have a capability for processing the email that is requested to be downloaded, and wherein receiving, by the computer processor of the client, the converted email sent by the server comprises receiving, by the computer processor of the client, an attachment based on the converted email and receiving the attachment to the server.

4. A server comprising:
a computer processor; and
a non-transitory computer readable medium,
wherein the non-transitory computer readable medium has instructions that when executed by the computer processor cause the computer processor to:
receive a connection request from a client, wherein the connection request from the client comprises a processing capability of the client, wherein the processing capability of the client comprises an indication of a language character set supported by the client;
receive an email downloading request from the client;
send prompt text to the client, wherein the prompt text notifies the client that content of the email cannot be displayed and inquires whether the client wants to display the content;
convert, according to the processing capability of the client, a body of the email into a format that is processable for the client when the client does not have a capability for processing an email that is requested to be downloaded; and
send an email to the client, wherein the email is obtained through conversion of the email to produce a converted email, and wherein the email is sent to the client comprises generating, by the computer processor of the server, and attachment based on the converted email and sending the attachment to the client.

5. The server according to claim 4, wherein the instructions further cause the computer processor to:
send the email to the client directly, wherein the email is obtained through conversion of the email; and
generate an attachment based on the email that is obtained through conversion of the email and add in a body of an original email a key word for prompting that the original email has been used as an attachment.

6. The processing method according to claim 1, wherein the processing capability of the client comprises the indication of the language character set supported by the client, an indication of an encoding manner supported by the client, an indication of an image format supported by the client, and an indication of a video format supported by the client.

7. The processing method according to claim 6, wherein the processing capability of the client comprises an instruction, and wherein the instruction has a format of X-Client-Ability: encoding manner, character set, image format, and video format.

8. The processing method according to claim 3, wherein the processing capability of the client comprises the indication of the language character set supported by the client, an indication of an encoding manner supported by the client, an indication of an image format supported by the client, and an indication of a video format supported by the client.

9. The processing method according to claim 8, wherein the processing capability of the client comprises an instruction, and wherein the instruction has a format of X-Client-Ability: encoding manner, character set, image format, and video format.

10. The server according to claim 4, wherein the processing capability of the client comprises the indication of the language character set supported by the client, an indication of an encoding manner supported by the client, an indication of an image format supported by the client, and an indication of a video format supported by the client.

11. The server according to claim 10, wherein the processing capability of the client comprises an instruction, and wherein the instruction has a format of X-Client-Ability: encoding manner, character set, image format, and video format.

12. The processing method according to claim 1, wherein the email comprises an attachment, and wherein the method further comprises converting, by the computer processor of the server, the attachment from a first format associated with a first computer program application to a second format associated with a second computer program application.

13. The processing method according to claim 12, wherein the first format comprises a Portable Document Format (PDF) format, wherein the second format comprises a MICROSOFT WORD format, and wherein the converted attachment is sent along with the email to the client.

14. The processing method according to claim 1, wherein the computer processor of the server is configured to identify the processing capability of the client through multiple manners, wherein a first manner comprises identifying the processing capability according to an identifier in the connection request, wherein the identifier specifies a mobile device, wherein a second manner comprises identifying the processing capability according to a path comprised in the connection request, wherein the path comprises a website address, and wherein a third manner comprises the connection request comprising both the identifier and the path.

15. The processing method according to claim 1, wherein the computer processor of the server is configured to identify the processing capability of the client through multiple manners, wherein a first manner comprises identifying the processing capability through an extended user-profile information field followed by a path, and wherein a second manner comprises identifying the processing capability through an extended user-agent field followed by an encoding scheme.

16. The processing method according to claim 1, wherein the computer processor of the server is configured to identify the processing capability of the client through multiple manners, wherein a first manner comprises identifying the processing capability through a character set, wherein a second manner comprises identifying the processing capability through an encoding scheme, and wherein a third manner comprises identifying the processing capability through both the character set and the encoding scheme.

17. The processing method according to claim 1, wherein the prompt text inquires whether the client wants to display the content comprises the prompt text inquiring whether the client wants to download a new attachment to view content of the email.

18. The processing method according to claim 1, further comprising deleting the email from the client after the converted email is received by the client, wherein the converted email comprises all information from the email.

* * * * *

UNITED STATES PATENT AND TRADEMARK OFFICE
CERTIFICATE OF CORRECTION

PATENT NO. : 9,438,544 B2
APPLICATION NO. : 13/731479
DATED : September 6, 2016
INVENTOR(S) : Jun Peng Page 1 of 1

It is certified that error appears in the above-identified patent and that said Letters Patent is hereby corrected as shown below:

In the Claims

Column 9; Line 5; Claim 1 should read:

A processing method for a mobile device to display an email comprising:
    receiving, by a computer processor of a server, a connection request from a client, wherein the connection request from the client comprises a processing capability of the client, wherein the processing capability of the client comprises an indication of a language character set supported by the client;
    receiving, by the computer processor of the server, an email downloading request from the client;
    sending, by the computer processor of the server, prompt text to the client, wherein the prompt text notifies the client that content of the email cannot be displayed and inquires whether the client wants to display the content;
    converting, by the computer processor of the server according to the processing capability of the client, a body of the email into a format that is processable for the client when the client does not have a capability for processing the email requested to be downloaded; and
    sending, by the computer processor of the server, a converted email to the client, wherein sending, by the computer processor of the server, the converted email to the client comprises generating, by the computer processor of the server, an attachment based on the converted email and sending the attachment to the client.

Signed and Sealed this
Fifteenth Day of November, 2016

Michelle K. Lee
*Director of the United States Patent and Trademark Office*